United States Patent
Rossbach

(10) Patent No.: US 8,558,156 B2
(45) Date of Patent: Oct. 15, 2013

(54) DEVICE FOR CAPTURING AND PRESERVING AN ENERGY BEAM WHICH PENETRATES INTO AN INTERIOR OF SAID DEVICE AND METHOD THEREFOR

(75) Inventor: Dennis R. Rossbach, Corrales, NM (US)

(73) Assignee: The Boeing Company, Chicago, IL (US)

( * ) Notice: Subject to any disclaimer, the term of this patent is extended or adjusted under 35 U.S.C. 154(b) by 348 days.

(21) Appl. No.: 12/912,944

(22) Filed: Oct. 27, 2010

(65) Prior Publication Data

US 2012/0104237 A1    May 3, 2012

(51) Int. Cl.
*G01J 1/44*    (2006.01)
*H01J 40/14*    (2006.01)

(52) U.S. Cl.
USPC .......................................... 250/206; 250/216

(58) Field of Classification Search
USPC .................... 250/206, 214.1, 214 R, 216, 226
See application file for complete search history.

(56) References Cited

U.S. PATENT DOCUMENTS

| | | | |
|---|---|---|---|
| 4,197,454 | A | 4/1980 | Knutsen |
| 4,229,659 | A | 10/1980 | Vaselich et al. |
| 4,730,113 | A | 3/1988 | Edwards |
| 5,279,741 | A | 1/1994 | Schott |
| 6,266,920 | B1 | 7/2001 | Weder |
| 2002/0148948 | A1* | 10/2002 | Hensel ........................ 250/214.1 |
| 2007/0139649 | A1* | 6/2007 | Siemens ........................ 356/338 |

* cited by examiner

*Primary Examiner* — Francis M Legasse, Jr.
(74) *Attorney, Agent, or Firm* — Weiss & Moy, P.C.; Jeffrey D. Moy

(57) ABSTRACT

A system for monitoring an energy beam burn through has a sheet formed of a material approximately transparent to optical radiation at a desired operating wavelength. A light detector is attached to the sheet. A coating is applied to the sheet and the light detector, wherein penetration of the coating by a light source allows the light source to scatter within the sheet. A response unit is coupled to the detector unit for signaling an alarm when the light detector senses the light source of a predetermined level.

16 Claims, 4 Drawing Sheets

DEVICE FOR CAPTURING AND PRESERVING AN ENERGY BEAM WHICH PENETRATES INTO AN INTERIOR OF SAID DEVICE AND METHOD THEREFOR

BACKGROUND

Embodiments of this disclosure relate generally to optical systems for high energy beams and, more particularly, to a high energy beam burn through sensor that detects when a high energy beam has deviated from an allowed test area.

High energy laser or electromagnetic (EM) beams (hereinafter energy beams) have many commercial and military applications. All such applications generally require a need to confine the high energy beam to a designated optical path. Derivation from the designated optical path may allow the high energy beam to "burn through" a component, and possibly inflict damage on anything along the unwanted optical path. Thus, early detection of energy beam burn through is desirable in order to lessen any potential risk of damage to property or nearby personnel.

Presently, thermal sensors and external beam scatter detectors may be used to detect derivation of the energy beam from the designated optical path. However, thermal sensors and beam scatter detectors may have a relatively slow response time. Further, thermal sensors and external beam scatter detectors may, in some environments, be subject to false positive alarm indications.

Therefore, it would be desirable to provide a system and method that overcomes the above. The systems and methods would provide a means for accurately determining when an energy beam has exited a predefined safe area.

SUMMARY

A system for monitoring an energy beam burn through has a sheet formed of a material approximately transparent to optical radiation at a desired operating wavelength. A light detector is attached to the sheet. A coating is applied to the sheet and the light detector, wherein penetration of the coating by a light source allows the light source to scatter within the sheet. A response unit is coupled to the detector unit for signaling an alarm when the light detector senses the light source of a predetermined level.

A system for monitoring an energy beam burn through has an enclosure formed of a material approximately transparent to optical radiation at a desired operating wavelength. At least one light detector is attached to the enclosure. A coating is applied to the enclosure and the light detector, wherein penetration of the coating by a light source allows the light source to scatter within walls forming the enclosure. A response unit is coupled to the detector unit for signaling an alarm when the light detector senses the light source of a predetermined level.

A method of detecting when a light source has deviated from a desired pathway comprising: attaching a detector for sensing light on a sheet of material approximately transparent to optical radiation at a desired operating wavelength; coating the sheet and the light detector, wherein an inner surface of the coating is reflective and the outer surface of the coating absorbs a light source, wherein penetration of the coating by the light source allows the light source to scatter within the sheet; and detecting the light source within the sheet by the detector.

The features, functions, and advantages can be achieved independently in various embodiments of the disclosure or may be combined in yet other embodiments.

BRIEF DESCRIPTION OF THE DRAWINGS

Embodiments of the disclosure will become more fully understood from the detailed description and the accompanying drawings, wherein.

DETAILED DESCRIPTION

Figure 1:
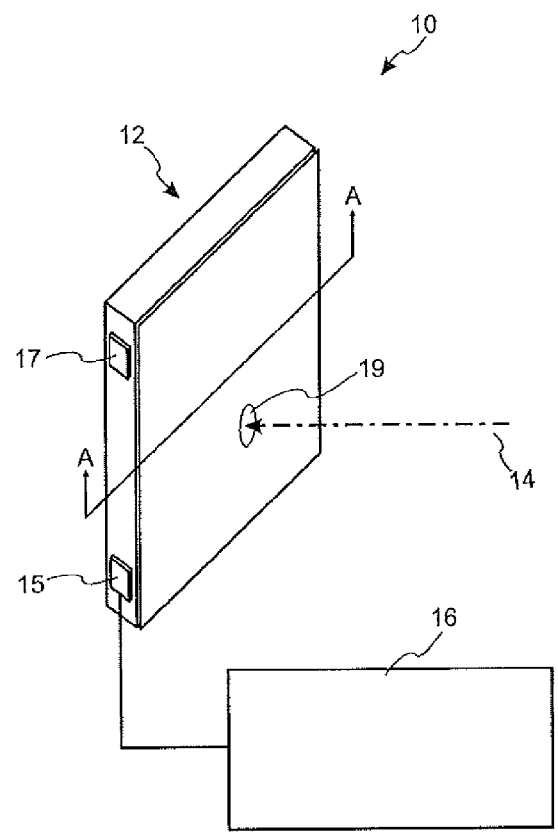
FIG. 1 is a block diagram of the energy beam burn through sensor system.

Referring to FIG. 1, an energy beam burn through system 10 (hereinafter system 10) is shown. The system 10 may have a sensor unit 12. The sensor unit 12 may be used to identify when an energy beam 14 may have deviated from a desired pathway. One or more detector units 15 may be positioned on the sensor unit 12. The detector unit 15 may be used to monitor any light signal received within the sensor unit 12. The detector unit 15 may be coupled to a response unit 16. The response unit 16 may be used to activate an alarm, response system, or the like when the detector unit 15 measures a light signal of a predetermined strength.

Figure 2:
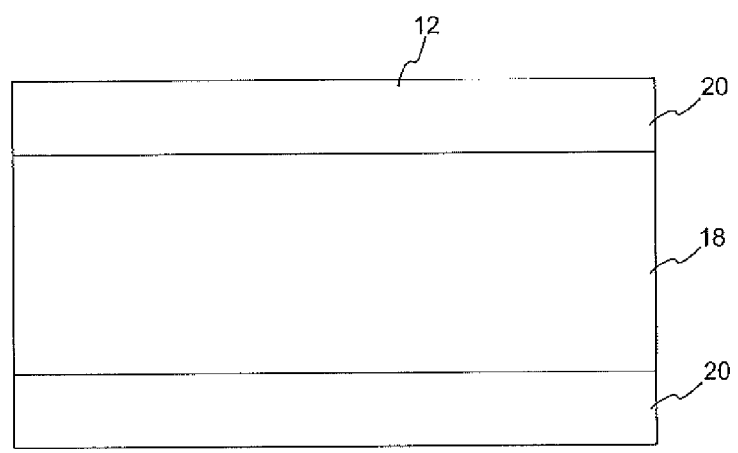
FIG. 2 is a magnified view of the energy beam burn through sensor.

Referring now to FIG. 2, a magnified view of a section of the sensor unit 12 is shown. In FIG. 2, the sensor unit 12 is a plane detector which may be used to detect the energy beam 14 (FIG. 1) or the energy beam scatter. The sensor unit 12 may be comprised of a sheet 18. The sheet 18 may be formed of a material which is transparent to optical radiation at a desired operating wavelength. In general, the desired operating wavelength may be defined as the wavelength region of the energy beam 14 (FIG. 1), scatter, and or secondary radiation. The sheet 18 may be formed of plastic, glass, polycarbonate, or the like. The above is given as one example of the different types of materials for the sheet 18 and should not be seen in a limiting scope. The material used for the sheet 18 may further be of high impact strength, may have a good fire rating and may be self extinguishing.

The sheet 18 may have a coating 20. In general, the entire sheet 18 may be covered with the coating 20. The coating 20 may be formed of one or multiple layers. The coating 20 generally is formed a material that has a low absorptivity for the operating wavelength as defined above. The material for the coating 20 may further have a high or acceptably high absorptivity for the direct beam and are nominally opaque to low power. One example of the coating 20 may be Avian D reflective coating to provide a good internal scatter match. The Avian D reflective coating may then be overcoated with black absorptive paint. Numerous other possibilities exist, but the inner surface 20A of the coating 20 should preserve the light inside the sheet 18 while the outside surface 20B should absorb enough energy to provide the indication.

Figure 3:
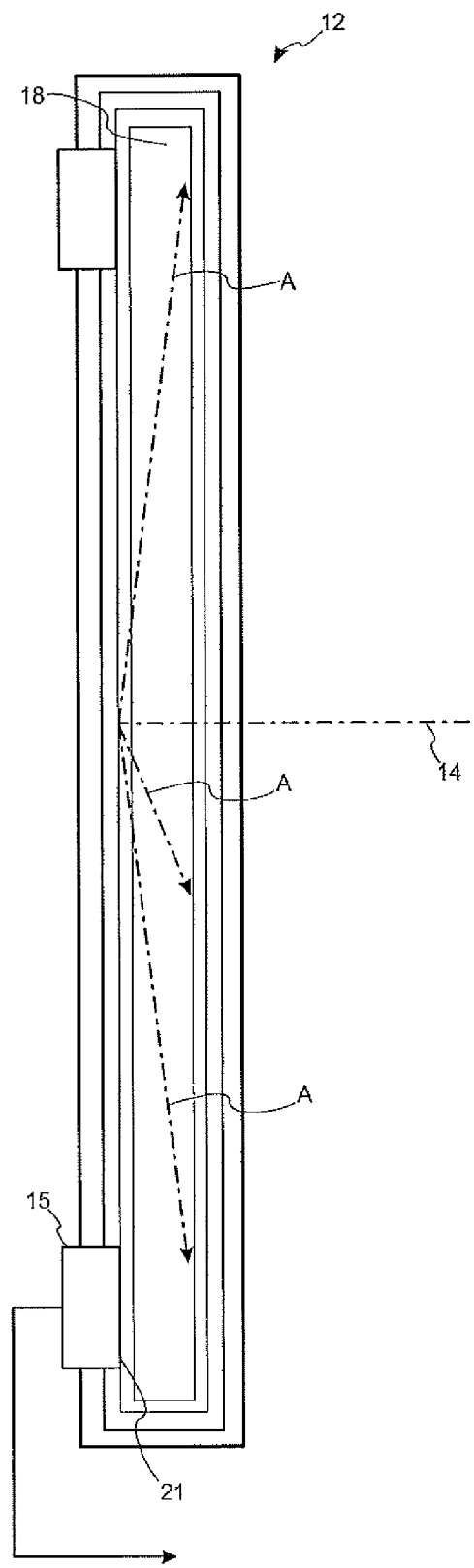
FIG. 3 is a cross-sectional view of the energy beam burn through sensor showing diffusion of the energy beam that enters the energy beam burn through sensor.

Referring now to FIGS. 1-3, the operating principle of the sensor unit 12 is that light absorbed from the energy beam 14 or scatter from the energy beam 14 (hereinafter energy beam 14) may burn through 19 the one or more layer or layers of the coating 20 on the sheet 18. At that time, the operating wavelength light of the energy beam 14 is transmitted into the sheet 18 which may act like an integrating sphere and or integrating structure.

An integrating sphere may be an optical component consisting of a hollow cavity with may have an interior coated for high diffuse reflectivity. Thus, once a light enters the integrating sphere, the light may tend to scatter repeatedly until the incident flux density at any location within the integrating sphere becomes nearly uniform. Thus, a light sensor located at any location within the integrating sphere would receive an average incident flux density defined by the equation $I=E/4\Pi R^2$ wherein E is the External Incident Light Exitance and R is the radius of the integrating sphere.

An integrating sphere may be stretched to form the plane version of the sensor unit 12. While the integrating sphere may be deformed into a sheet, the topology of the integrating sphere generally remains the same and thus, may still integrate any incoming light. While the uniformity of the incident flux density of the incoming energy beam 14 may not be as precise as a sphere due to the geometry change, the plane sensor unit 12 may still provide the incident flux density A at any location within the plane sensor unit 12 as shown in FIG. 3.

Since the sheet 18 of the plane sensor unit 12 may be covered with the coating 20, the wavelength light of the energy beam 14 that may be transmitted into the sheet 18 would be scattered repeatedly until the incident flux density at any location within the sheet 18 may become nearly uniform. Thus, a resulting signal at the detector unit 15 is obtained independent of where the burn-through or high power scatter occurs on the sensor unit 12 or the position of the detector unit 15 on the sheet 18. It should be noted that while the energy bean 14 that may burn through the coating 20 may be at the operating wavelength, an operating wavelength may be selected which is different from the burn through energy beam wavelength if the outer region is illuminated by the operating wavelength. The system 10 allows, for example, optical sensing of microwave burn through.

In general, the detector unit 15 may be attached to the sheet 18. The detector unit 15 may be attached to the sheet with an adhesive 21. The adhesive 21 may be an index matching nearly UV setting epoxy to provide a good optical path from the sheet 18 to the detector unit 15. Multiple detector units 15 may be used to provide multiple independent detection means for redundant safety systems. A high power microwave beam may also burn through the coating 20. In this case, the burn through event is detected by optical wavelength burn byproducts or ambient lighting detected by the detector unit 15.

The system 10 may be provided with a small test light source 17. The test light source 17 may be coupled to the sheet 18. The test light source 17 may be used to test the response unit 16. Unless the test light source 17 is activated, the normal light level in the sheet 18, and hence at the detector unit 15 may be extremely low since the coating 20 is generally selected to be opaque or nearly opaque. Thus, the detector unit 15 located in the sheet 18 generally would not detect any light source unless burned through by the energy beam 14 to be detected or the energy beam scatter.

Figure 4:
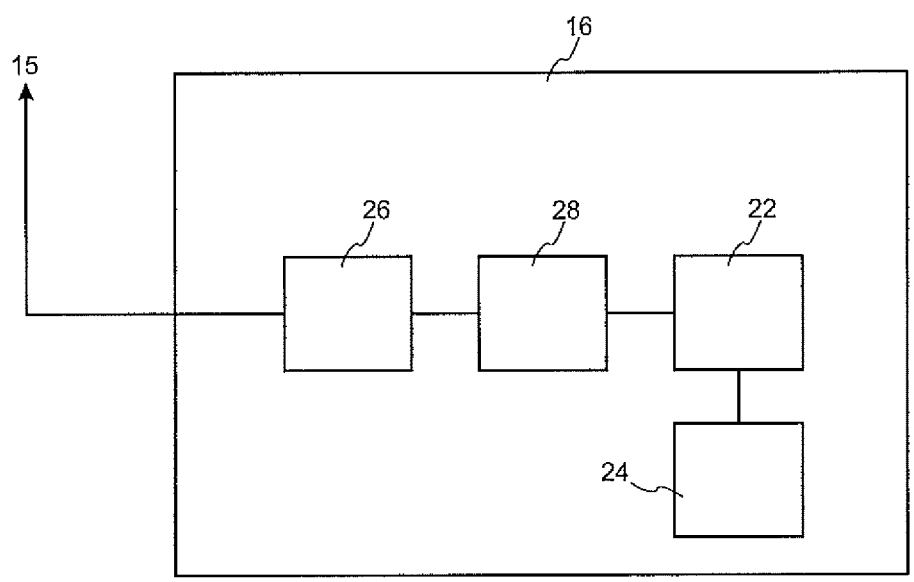
FIG. 4 is a block diagram of the detection circuit used in the energy beam burn through sensor system.

Referring now to FIG. 4, a block diagram of the response unit 16 is shown. The response unit 16 is coupled to the detector unit 15. If the detector unit 15 senses a light source, a signal may be sent to a threshold circuit 22 of the response unit 16. The threshold circuit 22 may be used to determine if the level of the light measured by the detector unit 15 exceeds a predetermined level. If the threshold circuit determines that the level of the light measured by the detector unit 15 does exceeds a predetermined level, a signal may be sent to an alarm unit 24. The alarm unit 24 may be used to signal that the energy beam 14 may have deviated from a desired pathway.

The response unit 16 may further have an amplifier 26. The amplifier 26 may be coupled to the detector unit 15. The amplifier 26 may be used to increase the signal level of the measured by the detector unit 15. A filter 28 may be coupled to the threshold circuit 22. The filter 28 may be used to remove any noise in the signal the measured by the detector unit 15.

Figure 5:
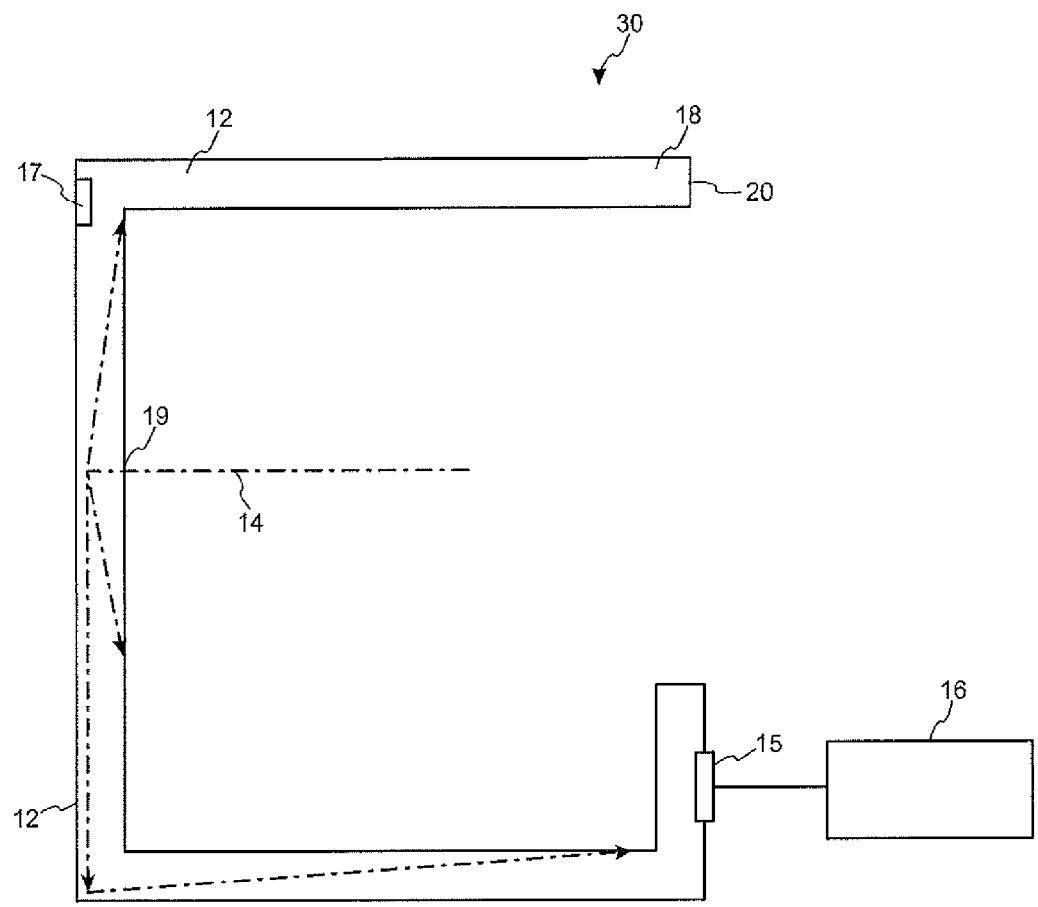
FIG. 5 is a container which may be used in the energy beam burn through sensor system.

Referring to FIG. 5, a plurality of the planer sensor units 12 may be bonded together to form an enclosure 30. The planer sensor units 12 may be optically bonded using typical polycarbonate glues. Alternatively, the enclosure 30 may be formed using hemispherical polycarbonate or PMMA domes. The enclosure 30 may have an opening 32. The opening 32 may be used to allow the energy beam 14 to enter the enclosure 30.

The enclosure 30 may operate in the following manner. The energy beam 14 or scatter from the energy beam 14 (hereinafter energy beam 14) may burn through 19 the one or more layer or layers of the coating 20 on one of the sheets 18 of the enclosure 30. At that time, the operating wavelength light of the energy beam 14 is transmitted into the penetrated sheet 18 of the enclosure 30. The wavelength light of the energy beam 14 that may be transmitted into the penetrated sheet 18 would be scattered repeatedly until the incident flux density at any location within the enclosure 30 may become nearly uniform. Thus, a resulting signal at the detector unit 15 is obtained independent of where the burn-through or high power scatter occurs on the enclosure 30.

The enclosure 30 may be provided with a small test light source 17. The test light source 17 may be coupled to one of the sheets 18. The test light source 17 may be used to test the response unit 16. Unless the test light source 17 is activated, the normal light level in the sheet 18, and hence at the detector unit 15 may be extremely low since the coating 20 is generally selected to be opaque or nearly opaque. Thus, the detector unit 15 located in the enclosure 30 generally would not detect any light source unless burned through by the energy beam 14 to be detected or the energy beam scatter.

The response unit 16 is coupled to the detector unit 15. If the detector unit 15 senses a light source of a predetermined strength, a signal may be sent to the response unit 16 which may be used to activate an alarm, response system, or the like.

While embodiments of the disclosure have been described in terms of various specific embodiments, those skilled in the art will recognize that the embodiments of the disclosure can be practiced with modifications within the spirit and scope of the claims.

What is claimed is:

1. A system for monitoring an energy beam burn through comprising:
   a sheet formed of a material approximately transparent to optical radiation at a desired operating wavelength;
   a light detector attached to the sheet;
   a coating applied to the sheet, the coating having an outer surface having a low adsorptivity for the operating wavelength of the optical radiation received by the outer surface and an inner surface for preserving the optical radiation within the sheet that has penetrated through the coating; and
   a response unit coupled to the detector unit for signaling an alarm when the light detector senses optical radiation of a predetermined level.

2. The system of claim 1, further comprising an adhesive for attaching the light detector attached to the sheet, wherein the adhesive provides an optical path from the sheet to the detector unit.

3. The system of claim 1, further comprising a test light coupled to the sheet.

4. The system of claim 1, wherein the response unit comprises:
   a threshold detector coupled to the light detector; and
   an alarm unit coupled to the threshold detector.

5. The system of claim 4, wherein the response unit further comprises:
   an amplifier coupled to the light detector and the threshold detector; and
   a filter coupled to the threshold detector.

6. The system of claim 1, further comprising a plurality of sheets to form an enclosure, the coating applied to each of the plurality of sheets, the light detector attached to one of the sheets.

7. The system of claim 1, wherein the sheet is an enclosure.

8. A system for monitoring an energy beam burn through comprising:
   an enclosure formed of a material approximately transparent to optical radiation at a desired operating wavelength;
   at least one light detector attached to the enclosure;
   a coating applied to the enclosure and the light detector, wherein penetration of the coating by a light source allows the light source to scatter within walls forming the enclosure; and
   a response unit coupled to the detector unit for signaling an alarm when the light detector senses the light source of a predetermined level;
   wherein the enclosure comprises a plurality of sheets formed of a material approximately transparent to optical radiation at a desired operating wavelength coupled to form the enclosure, the coating applied to each of the plurality of sheets, the light detector attached to one of the sheets.

9. The system of claim 8, wherein the coating having an outer surface having a low adsorptivity for the operating wavelength of the light source received by the outer surface and an inner surface for preserving the light source within the sheet that has penetrated through the coating.

10. The system of claim 8, further comprising an adhesive for attaching the light detector attached to the sheet, wherein the adhesive provides an optical path from the sheet to the detector unit.

11. The system of claim 8, further comprising a test light coupled to the sheet.

12. The system of claim 8, wherein the response unit comprises:
    a threshold detector coupled to the light detector; and
    an alarm unit coupled to the threshold detector.

13. The system of claim 12, wherein the response unit further comprises:
    an amplifier coupled to the light detector and the threshold detector; and
    a filter coupled to the threshold detector.

14. A method of detecting when a light source has deviated from a desired pathway comprising:
    attaching a detector for sensing light on a sheet of material approximately transparent to optical radiation at a desired operating wavelength;
    applying a coating to the sheet, wherein the coating has an outer surface having a low adsorptivity for the operating wavelength of the light source received by the outer surface and an inner surface for preserving the light source within the sheet that has penetrated through the coating, wherein penetration of the coating by the light source allows the light source to scatter within the sheet; and
    detecting the within the sheet by the detector.

15. The method of claim 14, further comprising:
    comparing a strength of the light source within the sheet to a predetermined level; and
    signaling when the light source within the sheet exceeds the predetermined level.

16. The method of claim 14, further comprising attaching a test light to the sheet of material for generating a test light within the sheet.

* * * * *